United States Patent [19]

Armond et al.

[11] 4,190,424
[45] Feb. 26, 1980

[54] GAS SEPARATION

[75] Inventors: John W. Armond, Buckhurst Hill; David A. Webber, Bishops Stortford; Kenneth C. Smith, Roydon, all of England

[73] Assignee: BOC Limited, London, England

[21] Appl. No.: 865,131

[22] Filed: Dec. 28, 1977

Related U.S. Application Data

[63] Continuation-in-part of Ser. No. 702,497, Jul. 6, 1976, abandoned.

[30] Foreign Application Priority Data

Jul. 17, 1975 [GB] United Kingdom ............... 30093/75

[51] Int. Cl.² ............................................... B01D 53/04
[52] U.S. Cl. ........................................... 55/58; 55/68; 55/75
[58] Field of Search ............... 55/25, 26, 31, 33, 58, 55/62, 68, 74, 75, 179, 189, 387, 389, 66

[56] References Cited

U.S. PATENT DOCUMENTS

| | | | |
|---|---|---|---|
| 2,918,140 | 12/1959 | Brooks | 55/75 X |
| 3,085,379 | 4/1963 | Kiyonaga et al. | 55/62 X |
| 3,102,013 | 8/1963 | Skarstrom | 55/58 X |
| 3,150,942 | 9/1964 | Vasan | 55/31 |
| 3,242,645 | 3/1966 | De Montgareuil et al. | 55/58 |
| 3,710,547 | 1/1973 | Nelson | 55/58 X |
| 3,719,025 | 3/1973 | Heinze et al. | 55/31 |
| 3,796,022 | 3/1974 | Simonet et al. | 55/33 X |
| 3,841,058 | 10/1974 | Templeman | 55/33 |
| 3,866,428 | 2/1975 | Simonet et al. | 55/75 X |
| 3,923,477 | 12/1975 | Armond et al. | 55/58 X |
| 4,011,065 | 3/1977 | Munzner et al. | 55/25 |

Primary Examiner—Robert H. Spitzer
Attorney, Agent, or Firm—Dennison, Dennison, Meserole & Pollack

[57] ABSTRACT

An air separation process using pressure swing adsorption techniques, for providing high purity oxygen. Two sections are employed one comprising beds of molecular sieve carbon and the other comprising beds of zeolite molecular sieve. Air is fed to a first of the sections which provides an oxygen-rich gas stream as feedstock for the next section where further enrichment takes place. The zeolite sieve section serves to effect a separation as between oxygen and nitrogen while the carbon sieve section serves to effect a separation as between oxygen and argon and the processes performed at each section are integrated in such a manner as to minimize power consumption and make use of gas recycled from the second section to the first in addition to the flow of gas from the first section to the second.

15 Claims, 6 Drawing Figures

GAS SEPARATION

This is a continuation-in-part of application Ser. No. 702,497, filed July 6, 1976, now abandoned.

FIELD OF THE INVENTION

This application relates to a method of gas separation using pressure swing adsorption techniques, more particularly for separating oxygen at high purity from a gaseous mixture, such as air, including oxygen, nitrogen and argon.

BACKGROUND OF THE INVENTION

The use of selective adsorbent materials in the enrichment of gas mixtures with desired components thereof is well known. For example to derive an oxygen-rich gas from an air feedstock it is known, as taught e.g. by U.S. Pat. No. 3,923,477 of J. W. Armond et al, to pass the air through a bed of material which preferentially adsorbs nitrogen, such as a zeolite molecular sieve, and to collect the unadsorbed components issuing from the bed as the desired product. In practice a cyclic operation is employed in which each cycle comprises the successive steps of passing the feedstock through the bed and collecting the product, regenerating the bed by evacuating or otherwise desorbing the adsorbed components from the bed, and refilling the bed in preparation for the next cycle. Materials which preferentially adsorb oxygen, such as molecular sieve carbon, can also by employed in a similar process to derive an oxygen-rich gas from an air feedstock, in this case the adsorbed components being collected from the bed as the desired product during the regeneration step of each cycle.

Although the pressure swing adsorption (psa) processes described above offer a relatively simple and inexpensive route to the production of oxygen-rich gas streams from air, as compared with conventional cryogenic air separation techniques, their usefulness in practice is limited by their inability to provide a product of sufficiently high purity for many applications. For the purposes of this specification a 'high purity' product is to be regarded as one in which the oxygen content is in the order of 99% or more.

Various refinements to the basic processes described above can be made with a view to increasing the purity of the product, but even so the maximum product purity which can be attained with the zeolite molecular sieve process is no more than 95% oxygen, and with the molecular sieve carbon process in only about 80% oxygen.

This can be explained as follows. The major constituents of atmospheric air are, in order, nitrogen, oxygen, argon and carbon dioxide, plus a varying proportion of moisture (water vapour). Present-day synthetic zeolite molecular sieves as used in a psa process as described above have the ability to effect virtually complete separation as between oxygen and nitrogen. Similarly moisture and carbon dioxide can be effectively separated off during passage of the feedstock through a zeolite bed. However, the adsorption isotherms of oxygen and argon on these materials are almost identical so that passage through a zeolite bed has no significant effect on the ratio of oxygen to argon in a gas mixture. Thus with an air feedstock the ratio of oxygen to argon in the product will inevitably be approximately the same as the atmospheric ratio of these gases, with the result that however effectively the oxygen is separated from the other major constituents of the feedstock there will still be a balance of about 5% argon in the oxygen product.

As regards the molecular sieve carbon process, the selectivity of adsorption exhibited by this material is the result of a rate effect in comparison with the zeolite sieve whose selectivity is the result of a capacity effect. In other words, whereas a separation of oxygen from nitrogen is achieved with a zeolite sieve by virtue of the material's ability to hold nitrogen more strongly than oxygen, the separation achieved with the carbon sieve is as a result of the material's more rapid adsorption of oxygen than of nitrogen. From the point of view of oxygen/nitrogen separation the rate effect of the carbon sieve is significantly less efficient than the capacity effect of the zeolite sieve and the oxygen product obtainable from an air feedstock with the carbon sieve process inevitably contains a considerable proportion of unseparated nitrogen. In practice the rates of adsorption of nitrogen and argon on molecular sieve carbon are about the same so that with an air feedstock the balance of the oxygen product will contain nitrogen and argon approximately in their atmospheric ratio. Carbon dioxide and moisture are adsorbed at a greater rate than nitrogen and argon so that unless the air is pre-treated to remove these consituents they will also be present as contaminants of the oxygen product.

To restate the position then, the zeolite sieve process can give a maximum oxygen purity of about 95% with the balance represented virtually entirely by argon, and the carbon sieve process, assuming pretreatment to effectively remove carbon dioxide and moisture, can give a maximum oxygen purity of about 80% with the balance represented by nitrogen and argon in their atmospheric ratio, i.e. about 19.75% nitrogen and 0.25% argon. For these reasons usage on a commercial scale of oxygen produced by psa air separation has hitherto been restricted to certain applications where high purity is not essential, notably in the treatment of sewage, furnace atmosphere enrichment and chemical oxidation processes. More general acceptance of psa as a commercially valuable means of producing oxygen from air is unlikely to be achieved until the art has progressed to the point where the product can regularly be obtained at a purity significantly better than that achieved hitherto and such as is conventionally obtained by cryogenic air separation techniques. By way of example, the efficiency of welding and cutting processes using oxygen is greatly dependent upon the purity of the gas available, and for these applications a purity of at least 99.5% is customarily specified. Likewise hospital and health authorites are most reluctant to accept anything less than a purity of this order for medical applications.

Accordingly it is a particular object of the present invention to provided a psa air separation process which will be capable of providing an oxygen product at the high purity demanded by most consumers and underlying the invention is the realisation that by suitably integrating the zeolite and carbon sieve processes described above an oxygen product can be obtained with a purity better than that which can be achieved by either of the known processes operated alone.

Two specific integrated processes are proposed. In each case there is a carbon sieve section and a zeolite sieve section each operating on psa cycles, the air feedstock being passed to a first of those sections and the oxygen-rich gas stream obtained thereby being passed as feedstock to the second section from which a high purity oxygen product is obtained. At the same time the overall preformance of the process is enhanced by the recycling as feedstock of an oxygen-rich gas stream from the second section to the first.

The carbon sieve section preferably comprises two beds each of which undergoes a cycle of feedstock admission and desorption, one bed being on the feed step of its cycle while the other bed is on the desorption step of its cycle and vice versa. The zeolite sieve section preferably comprises two beds each of which undergoes a cycle of feedstock admission, desorption and backfilling, the bed cycles being sequenced in the well-known manner so that one bed is on its feed step while the other bed is on its desorption and backfilling steps and vice versa.

In the preferred process dry, carbon dioxide free air is provided as feedstock to the carbon sieve section, as also are oxygen-rich gas streams obtained partly from the evacuation of a bed in the carbon sieve section and partly from the evacuation of a bed in the zeolite sieve section. With a two-bed carbon sieve section operating as indicated above, the evacuation of each bed in that section yields a gas stream of gradually increasing and then decreasing oxygen purity, the stream obtained during the middle part of the evacuation step being of about 80% oxygen purity and is fed to a first reservoir, while the streams obtained during the other parts of the evacuation step average about 50% purity and are fed to a second reservoir for eventual recycling as part of the feedstock to the carbon sieve section. The balance of the 80% oxygen stream is nitrogen and argon approximately in their atmospheric ratio, i.e. about 19.75 % nitrogen and 0.25% argon. This middle cut product from the carbon sieve section is used as the feedstock for the zeolite sieve section which, being capable of effecting virtually complete separation as between the oxygen and nitrogen, can provide a product stream with a proportion of oxygen as high as 99.7%, the balance being the small amount of argon passed from the carbon sieve section and which remains unadsorbed by passage through the zeolite sieve section. Thus it will be appreciated that the key to the high purity of the oxygen product obtainable with this integrated process resides not just in the ability of the carbon sieve section to provide an oxygen-enriched feedstock to the zeolite sieve section but in its ability to provide a feedstock which is depleted in argon, the one major constituent of atmospheric air which a zeolite sieve is incapable of separating from oxygen. Simple though this factor may appear, it is one which the prior art has singularly failed to recognise.

In the alternative process air is provided as feedstock to the zeolite sieve section as also is an oxygen-rich gas stream obtained during a feed step in the carbon sieve section. The zeolite sieve section gives a product containing approximately 90% oxygen with 5% nitrogen and 5% argon which is passed as feedstock to the carbon sieve section. As before the evacuation of each bed in the carbon sieve section yields a gas stream of gradually increasing and then decreasing oxygen purity. In this case the high purity stream obtained during the middle part of the evacuation step constitutes the product from the integrated process while the streams obtained during the other parts of the evacuation step are fed to a reservoir for eventual recycling as part of the feedstock for the carbon sieve section.

Once again the key to the high purity of the oxygen product obtainable with this process resides in the ability of the carbon sieve section to effect a separation as between oxygen and argon, which cannot be effected by the zeolite sieve section.

It is observed here that it has in the past been proposed to enrich a three or more component gas mixture with a desired component by passage through serially connected beds containing materials each of which selectively adsorbs one of the other components of the mixture. An example is U.S. Pat. No. 3,102,013 of C. W. Skarstrom. However, as will be more apparent from the ensuing description of preferred embodiments, the sequencing of the psa cycles performed at each section in the integrated processes of the present invention goes far beyond the simple serial feeding of gas through successive beds as proposed in the prior art.

The above-referenced Skarstrom patent states as one of its objects 'to provide a method whereby oxygen/nitrogen-rich products may be recovered from atmospheric air without liquefaction or other expensive or complicated procedures'. Be that as it may, Skarstrom gives no practical example of a process for obtaining a high-purity oxygen product from an air feedstock, his examples being concerned primarily with the separation of hydrogen/methane/heavy ends and methyl alcohol/water vapour/nitrogen mixtures. More particularly Skarstrom fails to teach such essential features of the present invention as a zeolite molecular sieve section producing an oxygen rich gas stream during a feed step, a molecular sieve carbon section producing an oxygen rich gas stream by desorption of adsorbed components and effecting a separation as between oxygen and argon, and the recycling as feedstock of an oxygen-rich gas stream from the second section to the first in addition to the passage of the enriched product stream from the first section to the second.

DETAILED DESCRIPTION OF THE PREFERRED EMBODIMENTS

Figure 1:
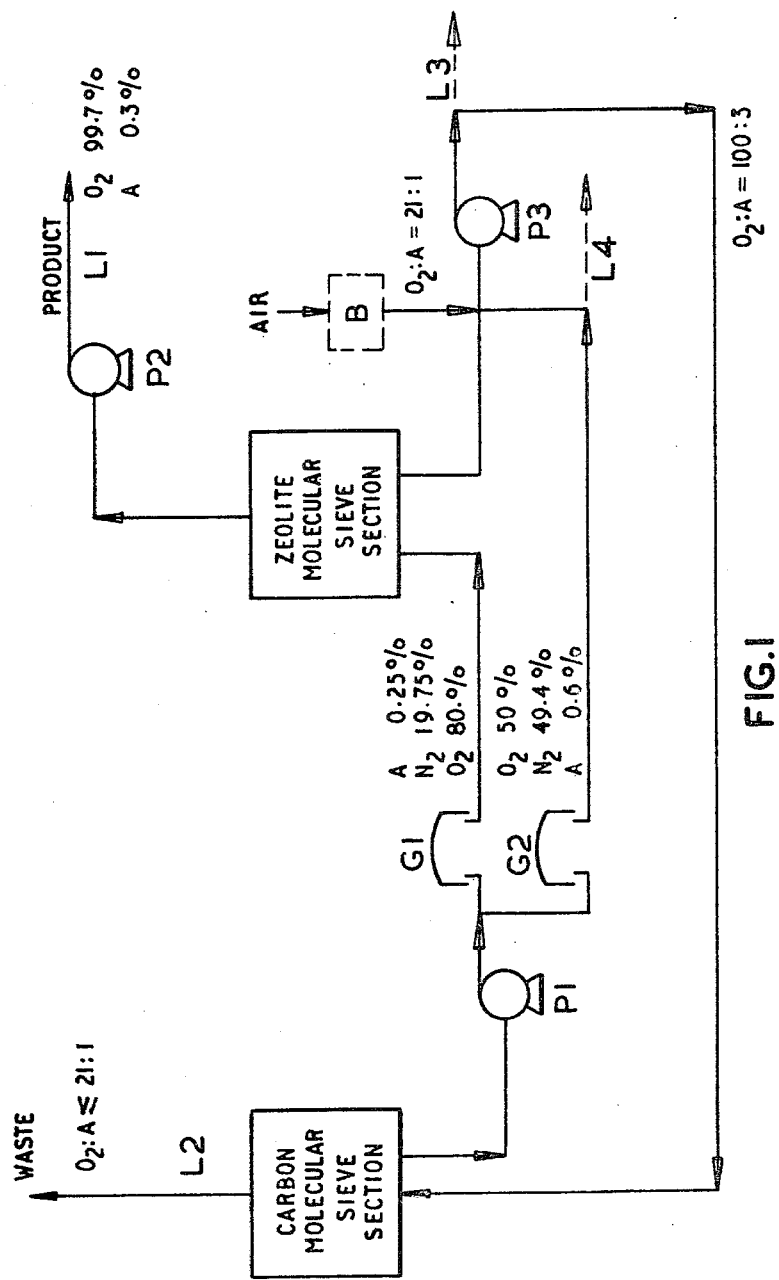
FIG. 1 is a simplified schematic representation of a first plant for deriving a high purity oxygen product from an air feed stock in accordance with the invention.
Figure 2:
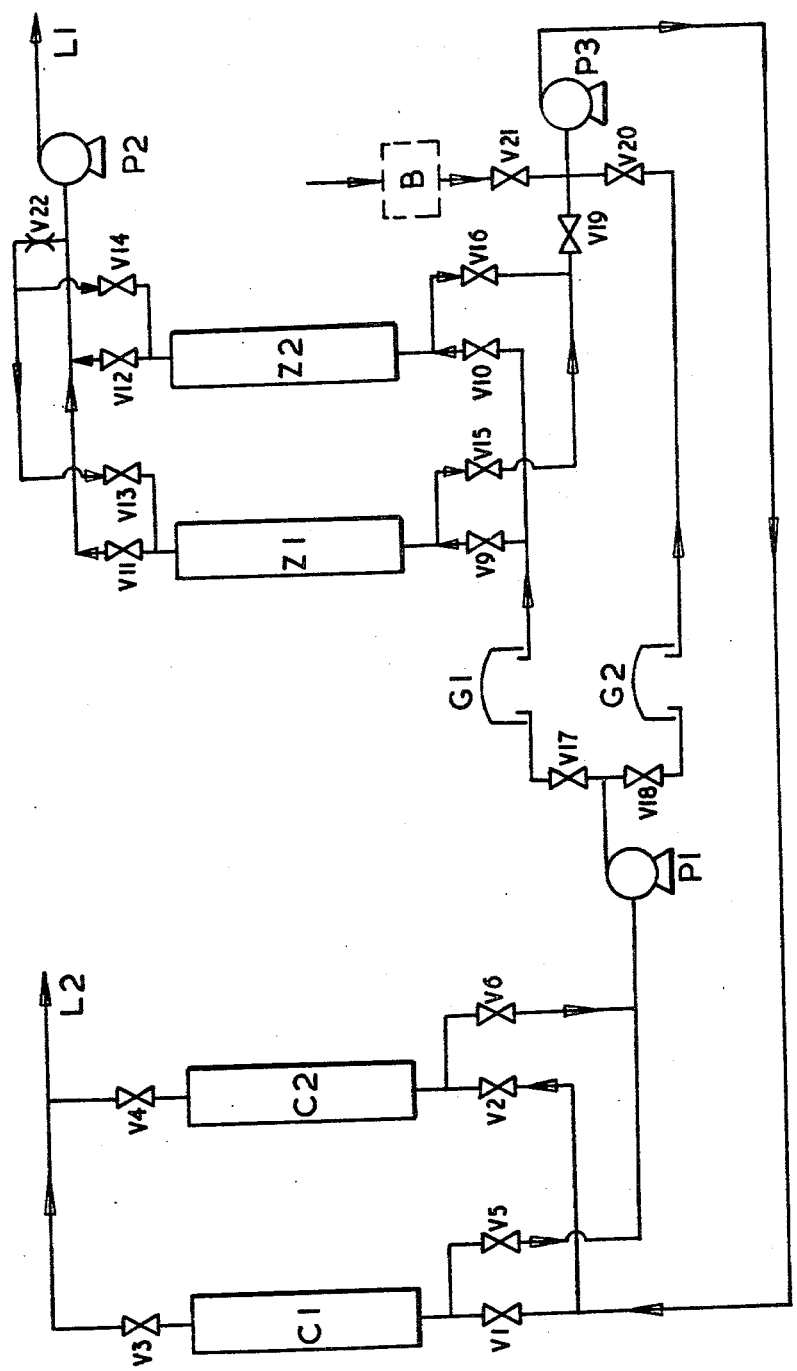
FIG. 2 is a more detailed schematic representation of the plant of FIG. 1.

The plant illustrated in FIGS. 1 and 2 has a carbon molecular sieve section comprising two adsorbent beds C1 and C2 and a zeolite molecular sieve section comprising two adsorbent beds Z1 and Z2. A first pump P1 serves the purpose of evacuating the beds of the carbon sieve section at the appropriate stages of their operating cycles and delivering the desorbed components to gas holders G1 and G2 as more fully described below. A second pump P2 serves the purpose of drawing feedstock for the zeolite sieve section through its beds Z1 and Z2 at the appropriate stages of their operating cycles and delivering the high purity oxygen product through the outlet line L1. A third pump P3 serves the purpose of evacuating the beds of the zeolite sieve section and passing the feedstock for the carbon sieve section through its beds C1 and C2 at the appropriate stages of the operating cycles of the beds.

Figure 3:
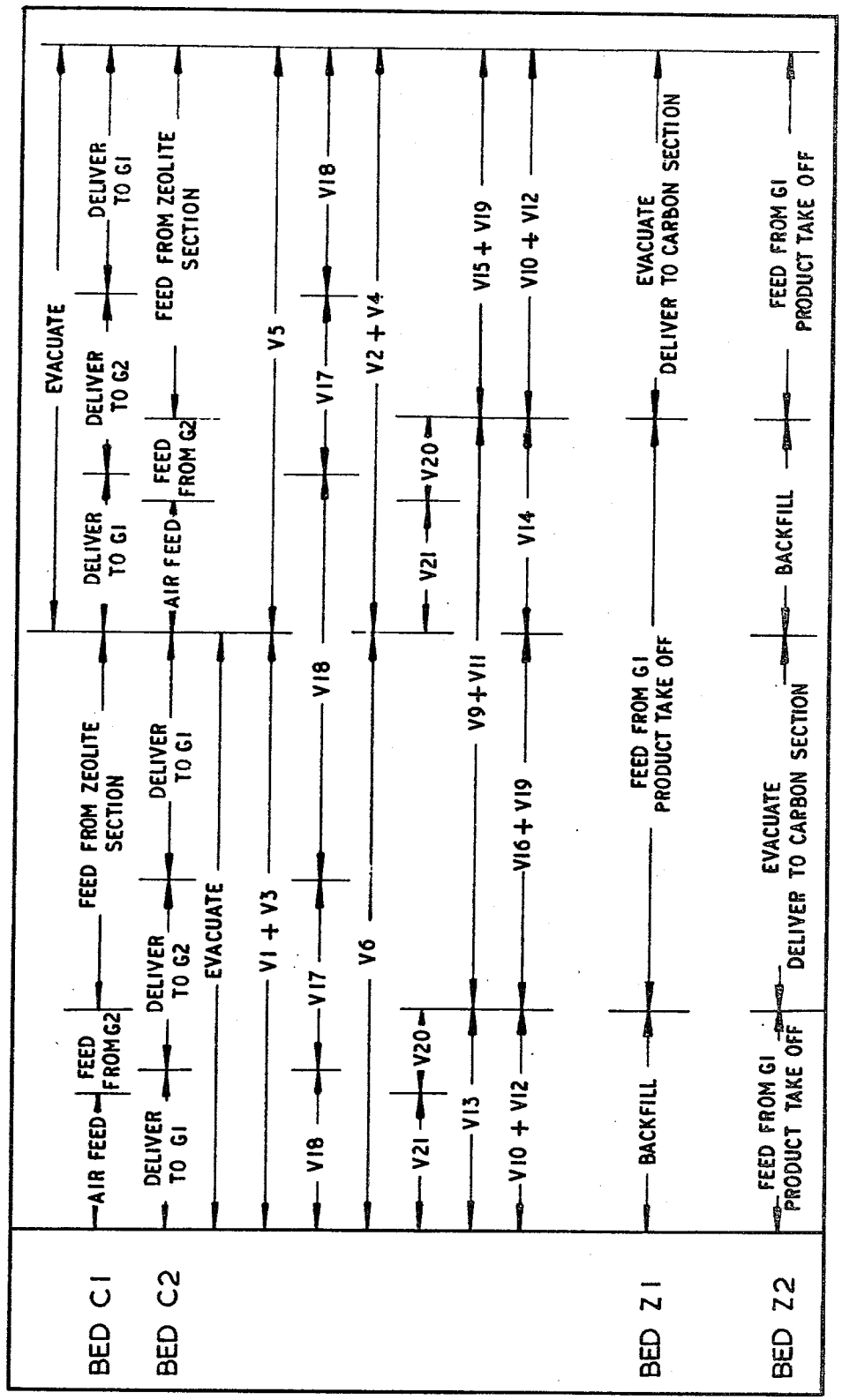
FIG. 3 is a diagram illustrating the valve operations and operating cycles of the adsorbent beds of the plant of FIGS. 1 and 2.

With reference to FIGS. 2 and 3, the operation of the plant is as follows.

Dealing first with the carbon sieve section, valves V1, V3, and V21 open so that pump P3 draws in feed air, which is pretreated in an adsorbent bed B to remove carbon dioxide and moisture, and passes the air through bed C1 of the carbon sieve section where oxygen is preferentially adsorbed. The unadsorbed gas, largely nitrogen and argon, passes out of the plant to waste via line L2. After a predetermined time period valve V21 closes and valve V20 opens so that an oxygen rich gas drawn from gas holder G2 passes through bed C1 purging out air from the interstices of the bed and providing more oxygen for adsorption by the carbon sieve. After another predetermined time period valve V20 closes and V19 opens (as also does valve V16) so that the pump P3 begins to evacuate bed Z2 of the zeolite section and passes the desorbed gas from that bed, which also has an enhanced proportion of oxygen in comparison with the original air feedstock, through bed C1. Valves V1, V3 and V19 then close, valve V5 opens, and bed C1 goes on to its evacuation (desorption) step. With the mode of operation proposed, the proportion of oxygen in the gas evacuated from the bed C1 by pump P1 gradually rises to a peak and then decreases again. During the middle part of the evacuation step valve V17 is open so that the desorbed gas is fed to gas holder G1 for use as feedstock for the zeolite section. The proportion of oxygen in this stream averages about 80% with the balance being nitrogen and argon approximately in their atmospheric ratio, i.e. about 19.75% nitrogen and 0.25% argon. During the other parts of the evacuation step the valve V18 is open so that the desorbed gas is fed to gas holder G2 for eventual recycling to the carbon sieve section. The proportion of oxygen in this stream averages about 50% with the balance again being nitrogen and argon approximately in the atmospheric ratio, i.e. about 49.4% nitrogen and 0.6% argon.

At the end of the evacuation step for bed C1, valve V5 closes, valves V1, V3 and V21 reopen, and the whole cycle of operation is repeated. It will be appreciated that bed C3 of the carbon sieve section undergoes a similar cycle to bed C1 but sequenced to be out of phase by 180° with the bed C1. In other words while bed C1 is undergoing its feed step bed C2 is undergoing its evacuation step, and vice versa.

Turning now to the zeolite sieve section, valves V9 and V11 open so that pump P2 draws gas from gas holder G1 through bed Z1 and delivers the product obtained from that bed through outlet line L1. It will be remembered that gas holder G1 contains the middle cut product from the carbon sieve section which is enriched in oxygen and depleted in nitrogen and argon. The remaining nitrogen in this mixture is adsorbed in bed Z1 to leave an oxygen product with a purity up to 99.7%, the balance being the small amount of argon passed from the carbon sieve section.

After a predetermined delay valves V9 and V11 close and valves V15 and V19 open so that pump P3 evacuates bed Z1 and passes the desorbed gas to the carbon sieve section, where bed C2 is on its feed step at this time. By virtue of the enhanced oxygen content of the feedstock passed through bed Z1 the gas evacuated from that bed will also have an oxygen content in excess of the atmospheric proportion and the gas is therefore useful as additional purge/feed gas for the carbon sieve section.

To complete the cycle of operation for bed Z1 valves V15 and V19 close and valve V13 opens to allow the bed to backfill with product quality gas withdrawn from bed Z2, via a permanently open throttle valve V22 set to permit the desired flow of backfill gas. Valves V9 and V11 then reopen and the whole cycle of operation is repeated.

It will be appreciated that bed Z2 of the zeolite sieve section undergoes a similar cycle to bed Z1 but sequenced to be out of phase by 180° with bed Z1. In other words when bed Z1 is undergoing its feed step bed Z2 is undergoing its evacuation and backfilling steps, and vice versa.

It will also be appreciated that the cycle times for the beds in the zeolite sieve section are exactly the same as for the beds in the carbon sieve section but, as indicated in FIG. 3, the cycles are suitably out of phase to achieve the required integration of the carbon and zeolite sieve processes. In particular, the sequencing of the cycles is such as to allow pump P3 to perform its dual function of evacuating the beds of the zeolite section and feeding the beds of the carbon section, so that the plant requires a total of only three pumps; normally two pumps are needed for each section so that running the two processes separately would require the provision of four pumps. A valuable power saving in running the integrated process is thereby achieved in addition to the increased oxygen purity obtained.

To assist in the understanding of the process the proportions of oxygen, nitrogen and argon in gas holders G1 and G2 and in outlet line L1 are marked on FIG. 1. The ratio of oxygen to argon at other parts of the plant are also marked, the figure indicated for the line from pump P3 to the carbon sieve section representing the average of the three different feed/purge streams passed to that section.

With minor modification this process can be operated without the pre-treatment bed B, i.e. with feed air containing carbon dioxide and moisture. A proportion of the carbon dioxide and moisture in the air fed to the carbon sieve section will pass out to waste via line L2, but the rest will be adsorbed and passed to the gas holders G1 and G2 during the evacuation steps of the beds. That fed to G1 will subsequently be adsorbed in the zeolite sieve section and contamination of the oxygen product with carbon dioxide and moisture can be effectively precluded by passing a proportion of the gas evacuated from the zeolite section out to waste via line L3 indicated in FIG. 1 and/or passing some or all of the 50% oxygen cut evacuated from the carbon sieve section out to waste via line L4 indicated in FIG. 1. The effect of these modifications is to reduce the equipment needed by omitting the adsorbent bed B, but at the expense of a certain amount of product gas.

Figure 4:
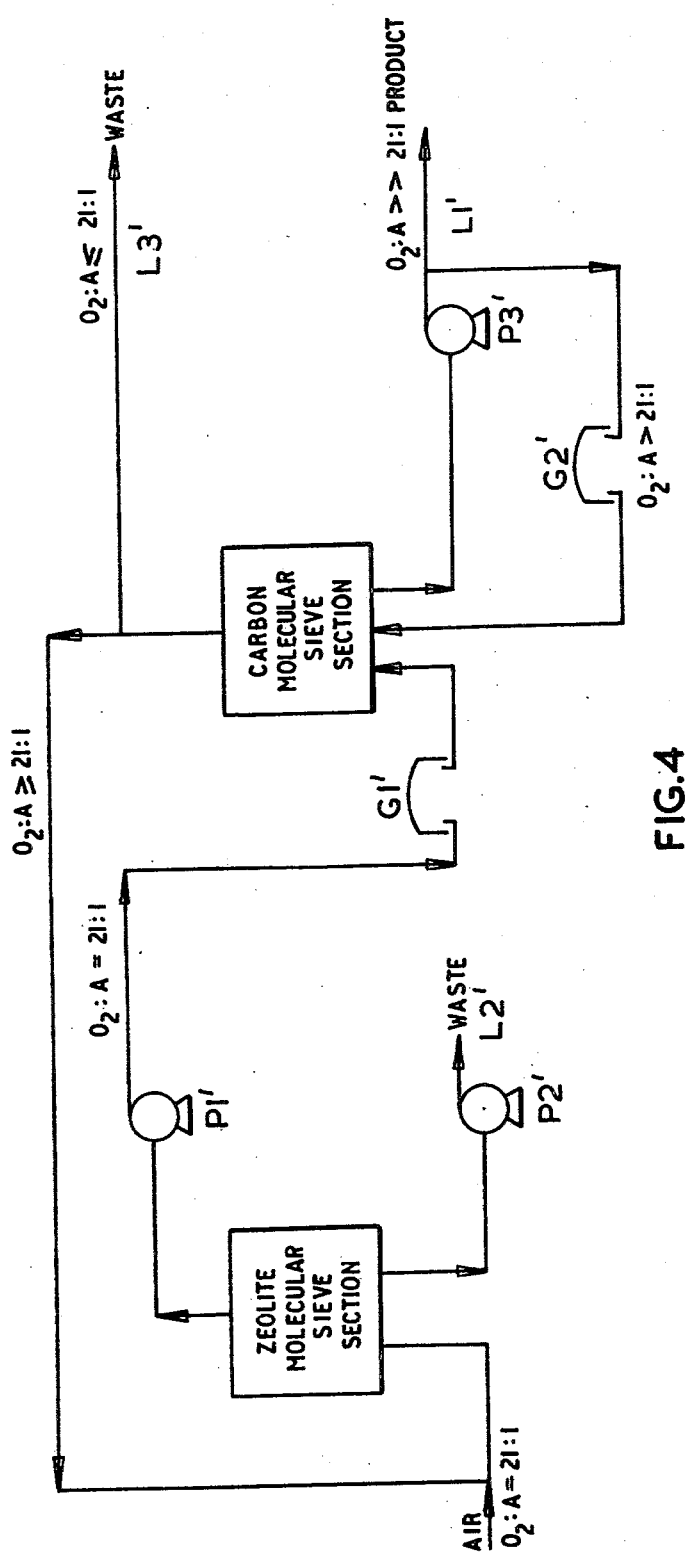
FIG. 4 is a simplified schematic representation of a second plant for deriving a high purity oxygen product from an air feedstock in accordance with the invention.
Figure 5:
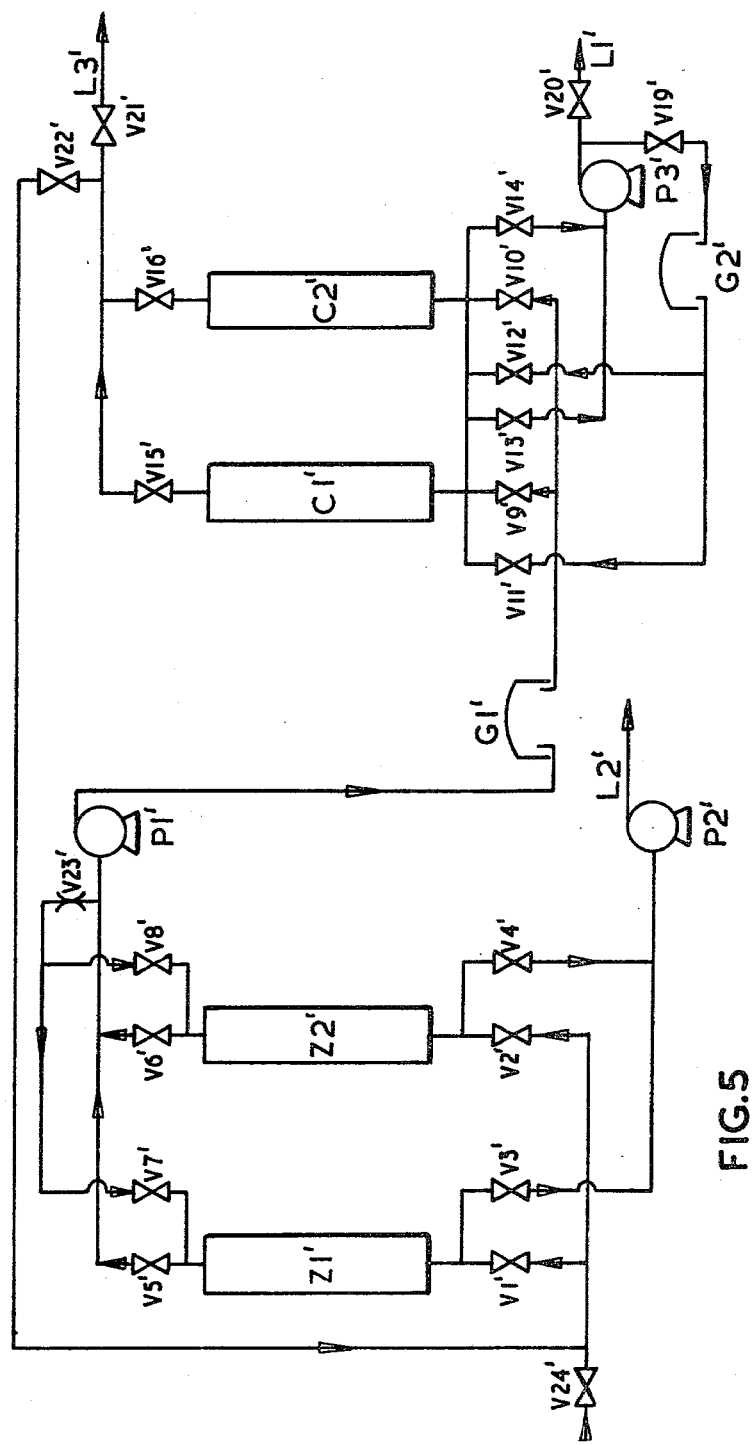
FIG. 5 is a more detailed schematic representation of the plant of FIG. 4.

The plant illustrated in FIGS. 4 and 5 has a zeolite molecular sieve section comprising two adsorbent beds Z1' and Z2' and a carbon molecular sieve section comprising two adsorbent beds C1' and C2'. A pump P1' serves the purpose of drawing the feedstock for the zeolite section through its beds Z1' and Z2' and delivering the unadsorbed gas obtained to a gas holder G1' thereby to act as feedstock for the beds C1' and C2' of the carbon section at the appropriate stages of the operating cycles of the beds. A second pump P2' serves the purpose of evacuating the beds of the zeolite section during he appropriate stages of their operating cycles and a third pump P3' serves the purpose of evacuating the beds of the carbon section, delivering the high purity oxygen product through the outlet line L1' and recycling a portion of the desorbed gas back to the carbon section via a gas holder G2', as more fully described below.

Figure 6:
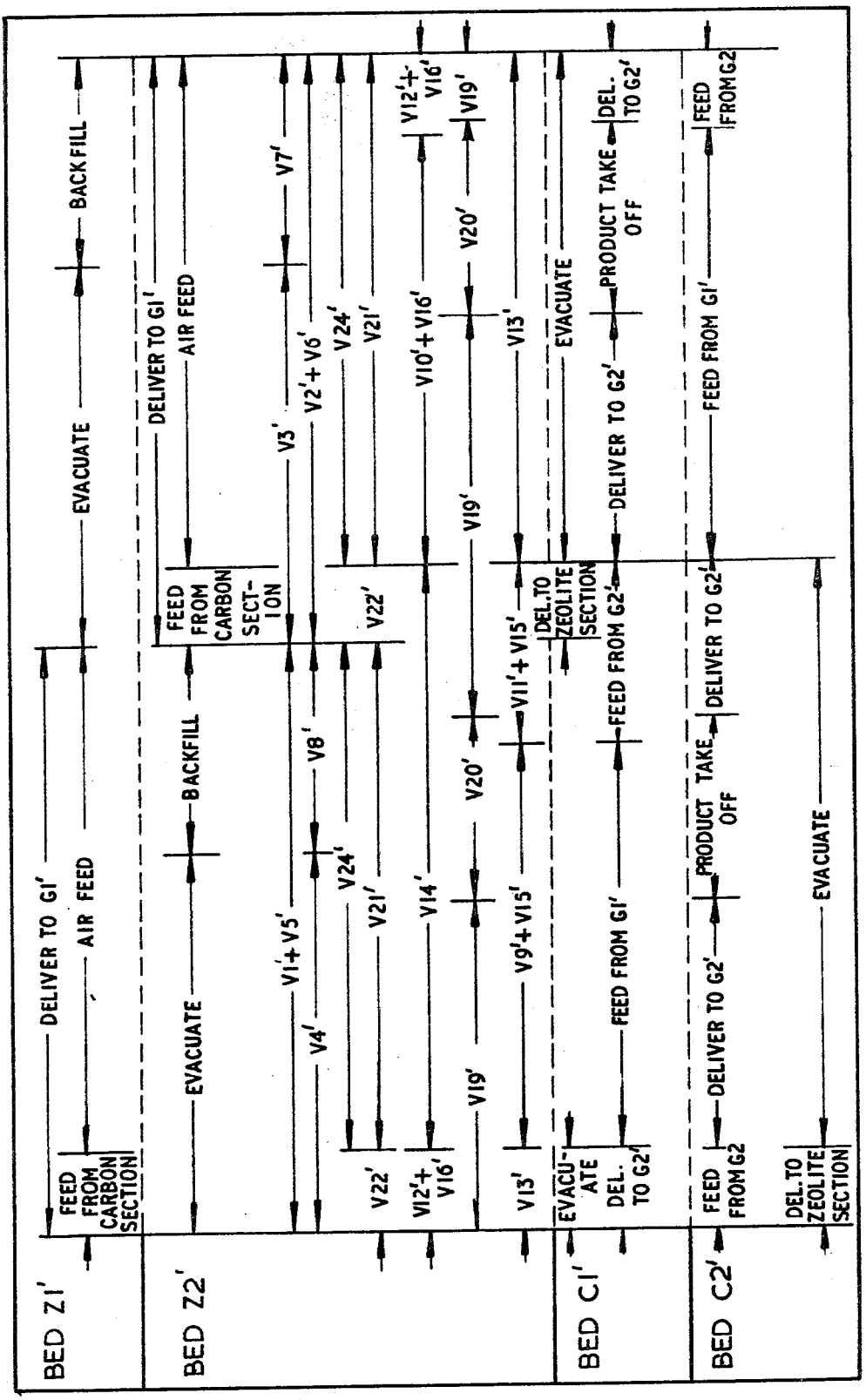
FIG. 6 is a diagram illustrating the valve operations and operating cycles of the adsorbent beds of the plant of FIGS. 4 and 5.

With reference to FIGS. 5 and 6, the operation of the plant is as follows.

Dealing first with the zeolite sieve section, valves V1' and V5' open so that pump P1' draws feedstock through bed Z1' and delivers the product obtained from that bed to the gas holder G1'. During an initial part of the feed step for bed Z1' valve V22' is open so that the feedstock comprises an oxygen rich gas recycled from the carbon section, thereafter valve V22 ' closing and valve V24' opening to admit atmospheric air as the feedstock. The air need not be pretreated to remove carbon dioxide and moisture as these components are adsorbed on the zeolite bed along with the major proportion of the nitrogen present in the feedstock, and subsequently passed out to waste. The composition of the gas fed to the gas holder G1' is approximately 90% oxygen, 5% nitrogen and 5% argon, the latter component being substantially unadsorbed by the zeolite bed.

After a predetermined time period valves V1' and V5' close and valve V3' opens so that pump P2' evacuates bed Z1' and passes the desorbed gas out to waste via line L2'. To complete the cycle of operation for bed Z1' valve V3' closes and valve V7' opens to allow the bed to backfill with the oxygen enriched gas being withdrawn from bed Z2', via a permanently open throttle valve V23' set to permit the desired flow of backfill gas. Valves V1' and V5' then reopen and the whole cycle of operation is repeated.

As before it will be appreciated that bed Z2' of the zeolite sieve section undergoes a similar cycle to bed Z1' but sequenced to be out of phase by 180° with bed Z1' so that when the first bed is undergoing its feedstep the second bed is undergoing its evacuation and backfilling steps and vice versa.

Turning now to the carbon sieve section, valves V9' and V15' open so that the oxygen enriched gas obtained from the zeolite sieve section passes from gas holder G1' through bed C1' where the oxygen is preferentially absorbed. After a predetermined time period, valve 9' closes and valve V11' opens, with valve V15' remaining open, so that an oxygen rich, argon depleted gas from gas holder G2' passes to bed C1'. During the initial part of this combined feeding step for bed C1' valve V21' is opened so that the unadsorbed gas which passes through the bed, being rich in nitrogen and argon, is passed out to waste via line L3'. During the final part of the feed step, however, after the feed source has been changed over to gas holder G2', the proportion of argon in the stream issuing from bed C1' decreases and the proportion of oxygen increases. Accordingly valve V21' is closed and valve V22 is opened to recycle this oxygen rich gas back to the zeolite sieve section, where bed Z2' has just commenced its feed step.

Valves V11', V15' and V22' then close, valve V13' opens, and bed C1' goes on to its evacuation (desorption) step. With the mode of operation proposed the purity of the oxygen product desorbed from bed C1' by pump P3' gradually rises to a peak and then decreases again. Thus during the middle part of the evacuation step valve V20 is open so that the desorbed gas passes out through product supply line L1'. During the other parts of the evacuation step valve V19' is open so that the desorbed oxygen rich gas is fed to gas holder G2' for recycling to the carbon sieve section as required.

At the end of the evacuation step for bed C1' valve V19' closes, valves V9' and V15' reopen, and the whole cycle of operation is repeated.

Once again it will be appreciated that bed C2' of the carbon sieve section undergoes a similar cycle to bed C1' but sequenced to be out of phase by 180° with bed C1', so that while the first bed is undergoing its feed step the second bed is undergoing its evacuation step, and vice versa.

Also the cycle times for the beds in the carbon sieve section are exactly the same as for the beds in the zeolite sieve section but, as indicated in FIG. 6, the cycles are suitably out of phase to achieve the required integration of the zeolite and carbon sieve processes. In particular, the sequencing of the cycles is such as to give the maximum benefits to the zeolite section from the use of recycle gas from the carbon section, i.e. it is fed in at the beginning of the respective feed steps for beds Z1' and Z2'. Again, the plant requires a total of only three pumps whereas each section operating alone would require two pumps to give a total of four.

To assist in the understanding of the process the ratio of oxygen to argon at various parts of the plant are marked on FIG. 4.

We claim:

1. A gas separation process employing a first section including at least one bed of molecular sieve carbon operated on a pressure swing adsorption cycle and a second section including at least one bed of zeolite molecular sieve operated on a pressure swing adsorption cycle, the process comprising: supplying a gas mixture containing oxygen, nitrogen and argon as feedstock to said first section; said first section providing, during a desorption step thereof, a first gas stream enriched in oxygen and depleted in nitrogen and argon as compared to said gas mixture; supplying such oxygen-enriched argon depleted gas as feedstock to the second section; said second section providing, during a feed step thereof, a second gas stream further enriched in oxygen and depleted in nitrogen than said first gas stream and providing, during a desorption step thereof, a third gas stream enriched in oxygen as compared to said gas mixture but less so than said second gas stream; and supplying said third gas stream to said first section to comprise part of the feedstock thereof.

2. A process according to claim 1 wherein said first section comprises two beds each of which operates on a cycle comprising the successive steps of feedstock admission and desorption, the cycles of the two beds being out of phase with one another by 180°.

3. A process according to claim 2 wherein said second section comprises two beds each of which operates on a cycle comprising the successive steps of feedstock admission, desorption and backfilling, the cycles of the two beds being out of phase with one another by 180°; and wherein the cycles of the beds of the second section are of the same duration as those of the beds of the first section but are out of phase therewith.

4. A process according to claim 2 wherein said first section provides said first gas stream during an intermediate stage of the desorption step of each of its beds.

5. A process according to claim 4 wherein said first gas stream is supplied to a reservoir from which the gas is made available as feedstock to the second section when required.

6. A process according to claim 4 wherein the gas desorbed from the beds of said first section during the remaining stages of the desorption steps thereof is recycled to said first section to comprise part of the feedstock thereof.

7. A process according to claim 6 wherein said gas desorbed from the beds of said first section during the remaining stages of the desorption steps thereof is supplied to a reservoir from which it is made availabe as feedstock to the beds of the first section in between feeding the gas mixture and said third gas stream to said beds of the first section.

8. A gas separation process employing a first section including at least one bed of zeolite molecular sieve operated on a pressure swing adsorption cycle and a second section including at least one bed of molecular sieve carbon operated on a pressure swing adsorption cycle, the process comprising: supplying a gas mixture containing oxygen, nitrogen and argon as feedstock to said first section; said first section providing, during a feed step thereof, a first gas stream enriched in oxygen and depleted in nitrogen as compared with said gas mixture; supplying such oxygen-enriched gas as feedstock to the second section; said second section providing, during a desorption step thereof, a second gas stream further enriched in oxygen than said first gas stream and depleted in argon, and providing, during a feed step thereof, a third gas stream enriched in oxygen as compared to said gas mixture but less so than said second gas stream; and supplying said third gas stream to said first section to comprise part of the feedstock thereof.

9. A process according to claim 8 wherein said first section comprises two beds each of which operates on a cycle comprising the successive steps of feedstock admission, desorption and backfilling, the cycles of the two beds being out of phase with one another by 180°.

10. A process according to claim 9 wherein said second section comprises two beds each of which operates on a cycle comprising the successive steps of feedstock admission and desorption, the cycles of the two beds being out of phase with one another by 180°; and wherein the cycles of the beds of the second section are of the same duration as those of the beds of the first section but are out of phase therewith.

11. A process according to claim 10 wherein said first gas stream is supplied to a reservoir from which the gas is made available as feedstock to the second section when required.

12. A process according to claim 10 wherein said second section provides said second gas stream during an intermediate stage of the desorption steps of each of its beds.

13. A process according to claim 12 wherein the gas desorbed from the beds of said second section during the remaining stages of the desorption steps thereof is recycled to said second section to comprise part of the feedstock thereof.

14. A process according to claim 13 wherein the gas desorbed from the beds of said second section during the remaining stages of the desorption steps thereof is supplied to a reservoir from which it is made available as feedstock to the beds of the second section after feeding the oxygen-enriched gas provided by the first section to said beds.

15. A process according to claim 10 wherein said third gas stream is supplied to the beds of the first section before the gas mixture is supplied to those beds during their feed steps.

* * * * *